(12) United States Patent
Hamilton

(10) Patent No.: US 8,096,927 B2
(45) Date of Patent: Jan. 17, 2012

(54) SHAFT-MOUNTED CLAMP

(76) Inventor: Frederick C. Hamilton, Wyoming, MI (US)

( * ) Notice: Subject to any disclaimer, the term of this patent is extended or adjusted under 35 U.S.C. 154(b) by 0 days.

(21) Appl. No.: 13/032,745

(22) Filed: Feb. 23, 2011

(65) Prior Publication Data

US 2011/0224053 A1    Sep. 15, 2011

Related U.S. Application Data

(60) Provisional application No. 61/312,416, filed on Mar. 10, 2010.

(51) Int. Cl.
A63B 21/072 (2006.01)

(52) U.S. Cl. .............................. 482/107; 24/502; 24/509

(58) Field of Classification Search .......... 482/107–109; 24/16 R, 132 AA, 132 R, 457, 502, 509, 24/649, 707; 403/315, 316, 319, 321, 325, 403/240, 256, 261; 248/62, 408–413
See application file for complete search history.

(56) References Cited

U.S. PATENT DOCUMENTS

| | | | | |
|---|---|---|---|---|
| 1,126,008 A * | 1/1915 | Herzog | ............................. | 24/707 |
| 1,879,865 A * | 9/1932 | Wright | ........................... | 248/157 |
| 2,051,969 A * | 8/1936 | Shastock | ........................ | 403/105 |
| 2,531,003 A * | 11/1950 | Slaker | ............................. | 24/510 |
| 2,537,703 A * | 1/1951 | Randa | ............................. | 248/75 |
| 2,609,132 A | 9/1952 | Palmer | | |
| 2,961,479 A * | 11/1960 | Bertling | ............................ | 174/43 |
| 3,588,023 A * | 6/1971 | Cohen | ............................ | 248/410 |
| 4,646,398 A * | 3/1987 | Myhrman | ..................... | 482/107 |
| 4,817,944 A * | 4/1989 | Anderson et al. | .............. | 482/107 |
| 4,955,603 A * | 9/1990 | Becker | ........................... | 482/107 |
| 5,108,066 A * | 4/1992 | Lundstrom | .................... | 248/410 |
| 5,295,933 A * | 3/1994 | Ciminski et al. | ............... | 482/107 |
| 5,295,934 A * | 3/1994 | Collins et al. | ................... | 482/107 |
| 5,302,039 A * | 4/1994 | Omholt | ........................... | 403/218 |
| 5,749,814 A * | 5/1998 | Chen | ............................... | 482/93 |
| 6,007,268 A * | 12/1999 | Whittington et al. | .......... | 403/328 |
| 6,179,514 B1 * | 1/2001 | Cheng | ............................ | 403/377 |
| 6,663,060 B1 * | 12/2003 | Gifford, Sr. | .................... | 248/161 |
| 6,887,189 B2 * | 5/2005 | Schiff | ............................. | 482/107 |
| 7,086,631 B2 * | 8/2006 | Lee et al. | ........................ | 248/161 |
| 7,111,359 B1 | 9/2006 | Luca | | |
| 7,494,451 B1 * | 2/2009 | Ramos | ........................... | 482/107 |
| 7,516,522 B2 | 4/2009 | Chene et al. | | |
| 7,611,104 B1 * | 11/2009 | Gifford, Sr. | ................. | 248/176.3 |
| 2003/0045407 A1 * | 3/2003 | Schiff | ............................. | 482/107 |
| 2008/0098578 A1 * | 5/2008 | Collie | ............................... | 24/457 |
| 2010/0005715 A1 * | 1/2010 | Allsop et al. | ....................... | 47/47 |
| 2010/0281658 A1 * | 11/2010 | Nguyen et al. | ................... | 24/457 |

* cited by examiner

*Primary Examiner* — Loan Thanh
*Assistant Examiner* — Daniel Roland
(74) *Attorney, Agent, or Firm* — Gardner, Linn, Burkhart & Flory, LLP

(57) ABSTRACT

A shaft-mounted clamp includes a pair of clamp members that are pivotably coupled to one another at one end, each clamp member including a through-hole for receiving the shaft to which the clamp is to be mounted. At least one of the clamp members includes a push rod that extends through the opposite clamp member, and which has a distal end portion that is contacted by an article supported on the shaft to increase the engagement of at least one of the clamp members on the shaft. A coupling device may be provided at one of the clamp members for suspending an article therefrom. The clamps may be readily repositioned along the shaft by squeezing the clamp members together (such as against the biasing force of a spring) to more closely align the through-holes with one another and thereby release the engagement of the clamp members with the shaft.

22 Claims, 12 Drawing Sheets

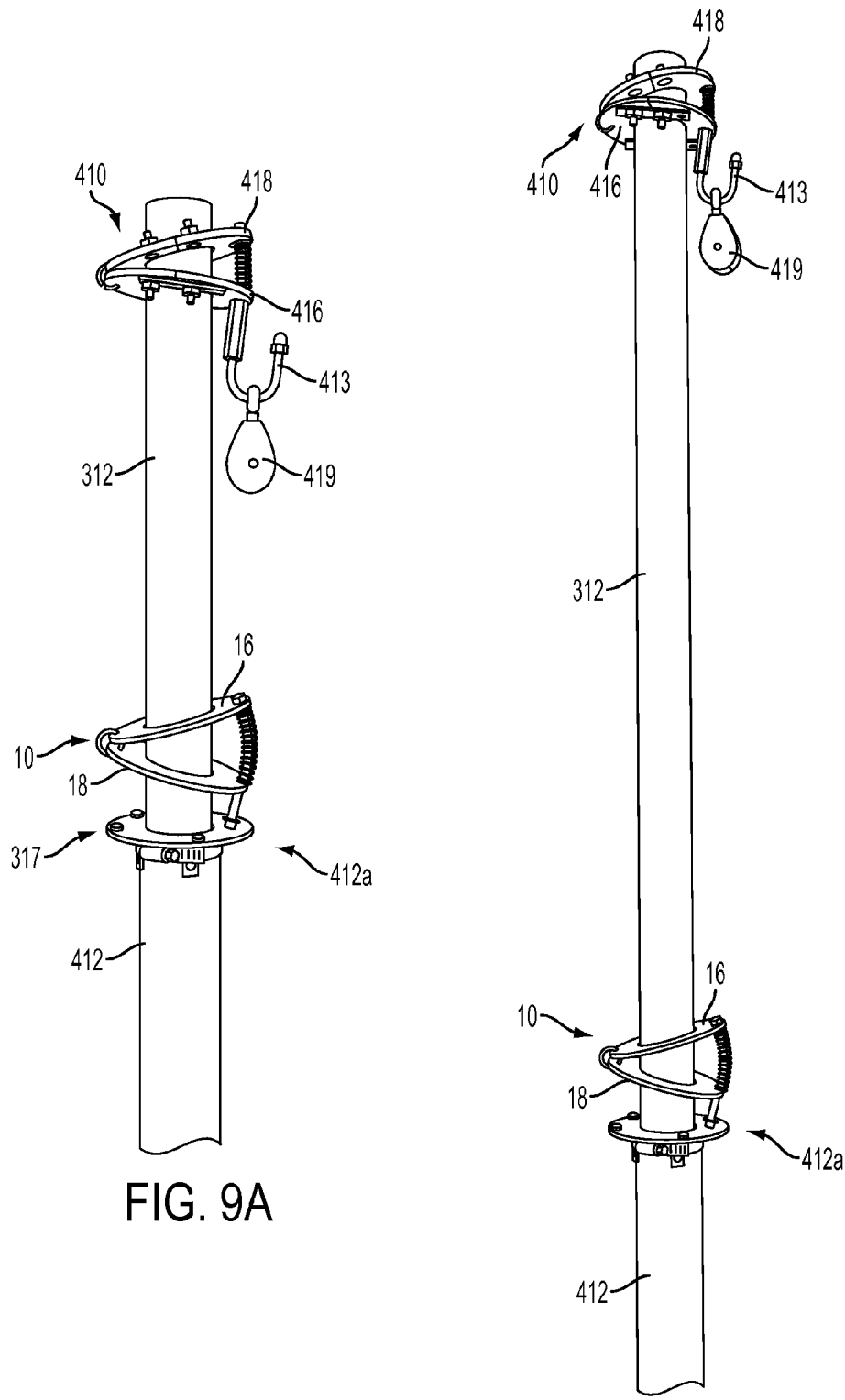

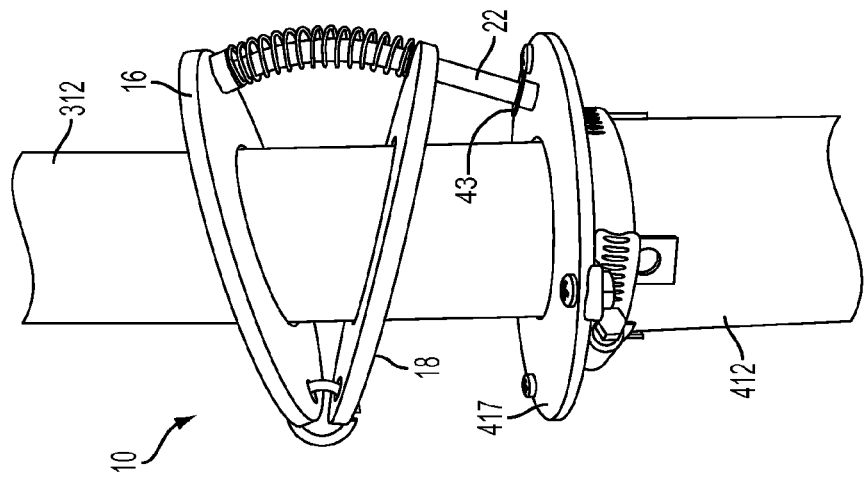
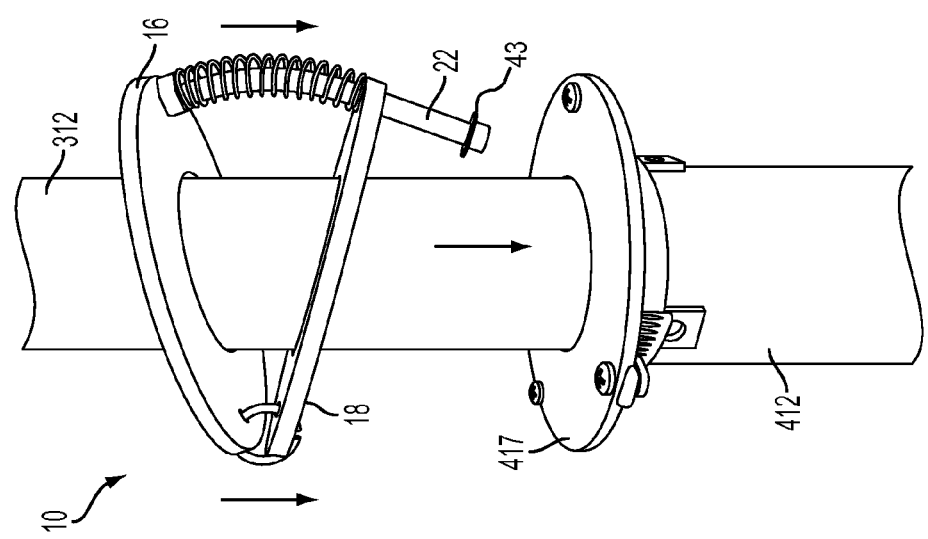

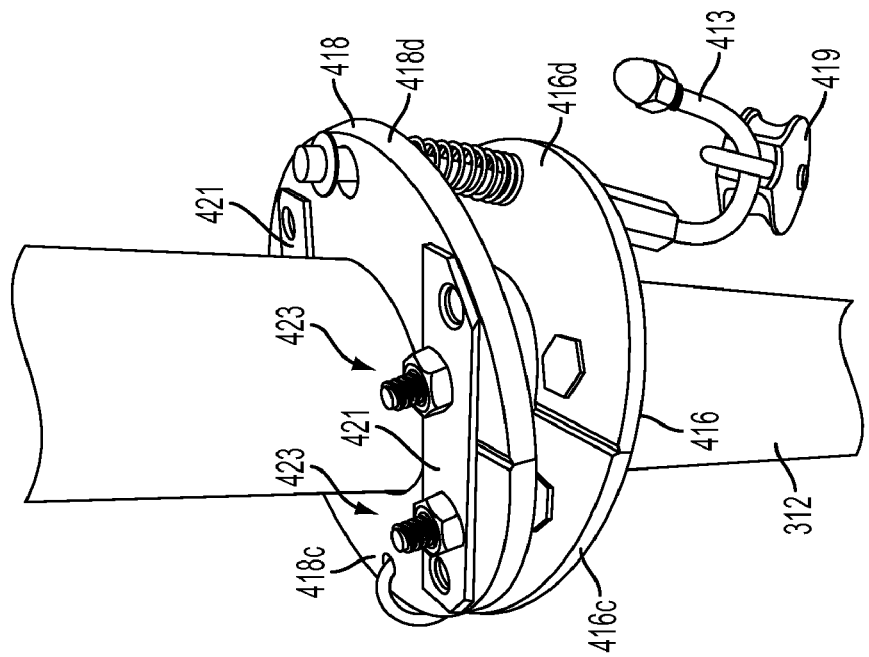
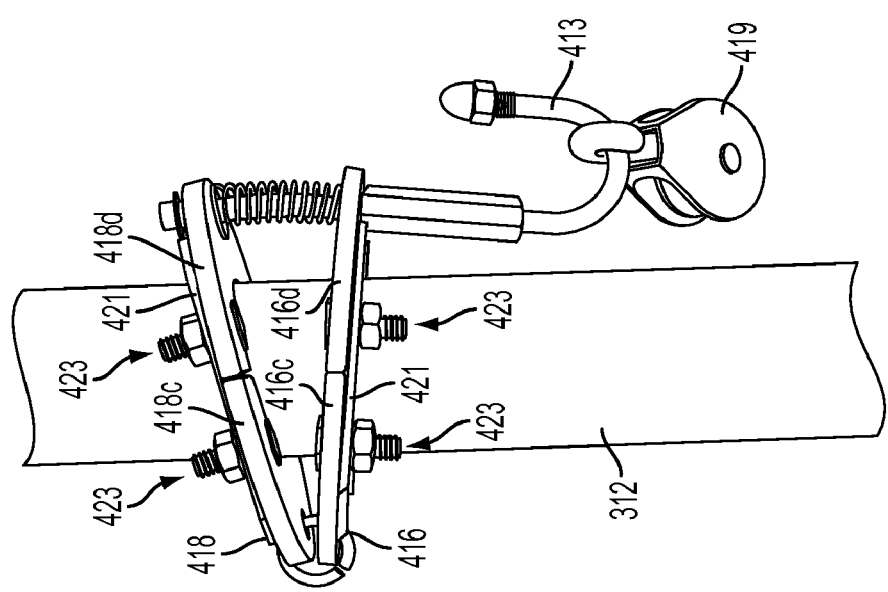
FIG. 11A
FIG. 11B

SHAFT-MOUNTED CLAMP

CROSS REFERENCE TO RELATED APPLICATION

The present application claims the priority benefit of U.S. provisional application Ser. No. 61/312,416, filed Mar. 10, 2010, which is hereby incorporated herein by reference in its entirety.

FIELD OF THE INVENTION

The present invention relates generally to clamps for engaging various types of shafts and, in particular, to clamps for shafts associated with material handling equipment, weightlifting equipment, and the like.

BACKGROUND OF THE INVENTION

Weightlifting barbells typically include a set of matching weight plates disposed on either end of a weightlifting bar, with a clamp disposed on the weightlifting bar outboard of the weight plates, to retain the weight plates on the bar. In addition, numerous fixturing devices use shafts to support articles at certain locations along the shafts, in which it may be desirable to use a clamp to selectively or temporarily secure the articles along the shaft at a fixed position or within a fixed range of positions.

SUMMARY OF THE INVENTION

The present invention provides a shaft-mounted clamp for retaining articles disposed along a shaft. The clamp includes first and second clamp members (such as annular rings) that are pivotably coupled to one another along one end or side thereof to generally form a 'V' shape, each clamp member defining a through-hole for receiving a shaft on which the clamp is to be installed. An elongate projection or "pushrod" extends from one of the clamp members (i.e. the "male" clamp member) and projects through an aperture in the other clamp member (i.e. the "female" clamp member) so that a distal end portion of the pushrod is configured to contact a weight plate (such as would be placed on a weightlifting bar) or other item or article along the shaft. A force applied to the pushrod, such as by the weight plate or other article, causes the male clamp member to more tightly engage the shaft by pivoting or urging the clamp member into greater misalignment with the shaft. The application of a force to the pushrod increases the engagement force of the clamp members to the shaft, to provide an even greater resistance to movement of the clamp along the shaft than when little or no force is applied to the pushrod.

According to one form of the present invention, a shaft-mounted clamp includes first and second clamp members, a hinge member, and an elongate projection. The first and second clamp members have respective inner edges defining first and second through-holes, respectively, each through-hole for receiving a part of a shaft. The hinge member is coupled to each of the first and second clamp members at locations spaced outwardly from the first and second through-holes. The clamp members are pivotably coupled to one another by the hinge member and are movable between an engaging configuration and a disengaging configuration. The elongate projection has a proximal end portion and a distal end portion, the proximal end portion coupled to the first clamp member, and the distal end portion extending toward and at least partially beyond the second clamp member. When the first and second clamp members are in the disengaging configuration, the shaft may be readily positioned in or moved along both of the first and second through-holes. When the first and second clamp members are in the engaging configuration, the shaft is fixedly engaged by the inner edge of at least the first clamp member. The engagement of the inner edge of the first clamp member with the shaft may be increased by applying a force to the distal end portion of the elongate projection in the general direction of the first clamp member.

In one aspect, the elongate projection extends through another through-hole in the second clamp member so that the second clamp member moves along the elongate projection as the clamp members move between the engaging configuration and the disengaging configuration.

In another aspect, the elongate projection includes a stop member at the distal end portion, the stop member having a larger diameter than the third through-hole of the second annular clamp member and configured to limit the maximum spacing between the first and second annular clamp members at the elongate projection.

In yet another aspect, the stop member is an adjustable fastener that includes a mounting end portion, a socket portion, and a bearing (such as a ball bearing). The mounting end portion is adjustably securable at two or more positions along the elongate projection. The socket portion is at an opposite end of the adjustable fastener, and is configure to receive and retain the bearing so that the bearing at least partially protrudes from the socket portion.

In still another aspect, a biasing member is positioned in the socket portion of the adjustable fastener. The biasing member is configured to apply an outward biasing force to the bearing and to permit the ball bearing to be urged into the socket portion against the biasing force of the biasing member.

According to another form of the present invention, a shaft-mounted clamp includes first and second clamp members that are pivotably coupled to one another by a hinge member to form a 'V' shape, with an elongate projection extending from a first of the clamp members. Each of the first and second clamp members has an outer circumferential edge portion and an inner circumferential edge portion, where the respective inner circumferential edge portions define a first through-hole (in the first clamp member) and a second through-hole (in the second clamp member) for receiving a shaft with a diameter that is at least slightly smaller than that of the first and second through-holes. The elongate projection has a proximal end portion attached to the first clamp member, and has a distal end portion that extends through a third or projection-receiving through-hole in the second clamp member.

The two clamp members are pivotable relative to one another at the hinge member, and pivot between an engaging configuration in which there is a larger angle between the two clamp members, and a disengaging configuration in which there is a smaller angle between the two clamp members. When the clamp members are in the disengaging configuration, the shaft may be positioned in, or removed from, both of the first and second through-holes. When the clamp members are in the engaging configuration, the shaft is fixedly engaged by the inner circumferential edge portion of at least the first clamp member. A force applied to the distal end portion of the elongate projection, in the direction of the first clamp member, enhances or increases the engagement force of the inner circumferential edge portion of the first clamp member with the shaft, which limits or substantially prevents movement of the clamp along the shaft.

In one aspect, a biasing member that is disposed between the first and second clamp members biases the rings apart from one another and generally toward the engaging configuration. Optionally, the biasing member is a coil spring disposed between an inner surface of the first clamp member and an outer surface of the second clamp member. The coil spring may be disposed around the elongate projection, for example.

In another aspect, the elongate shaft is arcuate in shape, and may have a radius of curvature approximately equal to the distance between the elongate shaft and the hinge member.

In yet another aspect, the third through-hole of the second clamp member is an elongate slot that is sized and shaped so that the elongate projection can move within the slot in a radial direction of the second clamp member.

In still another aspect, the elongate projection includes a stop member at its distal end portion, the stop member having a larger diameter than the third projection-receiving through-hole of the second clamp member. The stop member is configured to limit the spacing between the first and second clamp members at the elongate projection. Optionally, the stop member is one chosen from: (i) the flared end of the elongate projection, (ii) a flange, and (iii) an adjustable fastener that may be repositioned along the elongate projection. When the stop member is an adjustable fastener, either the fastener or the distal end portion of the pushrod may include a threaded bore, while the other of the adjustable fastener and the distal end portion of the pushrod is correspondingly threaded for mutual engagement so that the spacing between the first and second clamp members is controllable by adjusting the position of the relative to the elongate projection.

In a further aspect, the shaft-mounted clamp may further include a second elongate projection extending from the second clamp member, and projecting through a fourth projection-receiving through-hole of the first clamp member so that the clamp may be positioned at either of two 180 degree-opposed orientations on the shaft, so that at least one of the elongate projections may receive a force applied in the direction of its respective clamp member to further urge the clamp member into engagement with the shaft.

In yet another aspect, each of the first and second clamp members is a split ring having two halves and at least one releasable fastener for holding the halves together, and for allowing at least partial separation of the halves.

In a further aspect, each of the first and second clamp members is a plate such as, for example, a metal plate. Optionally, the plates may be annular rings.

In another aspect, the first clamp member has a coupler for suspending an article from the first clamp member. A force applied to the coupler in a direction generally away from the first clamp member enhances the engagement of the inner circumferential edge portion of the first clamp member with the shaft.

In a further aspect, a weightlifting device including an elongate weightlifting bar with a central gripping portion and opposed end portions for supporting weight plates is equipped with two of the shaft-mounted clamps, with one clamp on each opposed end portion of the weightlifting bar to secure one or more of the weight plates at each of the weightlifting bar end portions.

In another form of the present invention, a shaft-mounted clamp includes first and second clamp members, a hinge member, and a coupling device. The first and second clamp members have respective inner edges defining first and second through-holes, respectively, each through-hole for receiving a part of a shaft. The hinge member is coupled to each of the first and second clamp members at locations spaced outwardly from the first and second through-holes. The clamp members are pivotably coupled to one another by the hinge member and are movable between an engaging configuration and a disengaging configuration. The coupling device is mounted at either the first or second clamp member, and is spaced outwardly from the clamp member's respective through-hole. The coupling device is for engaging an article in order to suspend the article from the coupling device. When the first and second clamp members are in the disengaging configuration, the shaft may be readily positioned in or moved along both of the first and second through-holes. When the first and second clamp members are in the engaging configuration, the shaft is fixedly engaged by the inner edge of at least the clamp member to which the coupling device is attached. The engagement, with the shaft, of the inner edge of the clamp member to which the coupling device is attached may be increased by suspending the article from the coupling device.

Thus, the present invention provides a clamp that is readily repositionable along a shaft, and which increases its engagement with the shaft and its resistance to movement along the shaft when a force is applied to a pushrod on the clamp, such as a force applied by an article positioned along the shaft. The clamp is readily moved or pivoted from an engaging configuration to a disengaging configuration by squeezing two clamp members together. The clamp may also be used to selectively fix the relative positions of telescoping shafts, such as for fixturing apparatuses, extendable masts, and the like.

These and other objects, advantages, purposes, and features of the present invention will become apparent upon review of the following specification in conjunction with the drawings.

BRIEF DESCRIPTION OF THE DRAWINGS

FIG. 9A-9B are side perspective views of a pair of shaft-mounted clamps on a telescoping shaft in a lowered position and in a raised position, respectively;

FIGS. 10A-10B are side perspective views of the lower shaft-mounted clamp of FIGS. 9A-9B with the telescoping shaft in a slightly raised position and in a lowered position, respectively;

FIG. 11A is a side perspective view of the upper shaft-mounted clamp of FIGS. 9A-9B;

FIG. 11B is a top perspective view of the shaft-mounted clamp of FIG. 11A;

DESCRIPTION OF THE PREFERRED EMBODIMENTS

The present invention is directed to a shaft-mounted clamp for use on shafts that support other articles or objects along the shafts, or for use with telescoping shafts. For example, embodiments of the present invention will be primarily described herein with reference to a barbell having a weight-lifting bar supporting a plurality of weight plates in a generally horizontal orientation. However, it will be appreciated that the clamp of the present invention may work equally well with fixturing devices, such as devices for adjusting the height of a table that is movably supported along a shaft, with shafts that telescope relative to one another, with shafts used for supporting different types of articles, and/or substantially any application in which it is desirable to use a strong and secure clamp that remains readily repositionable and/or removable from the shaft to which it is mounted.

Figure 1:
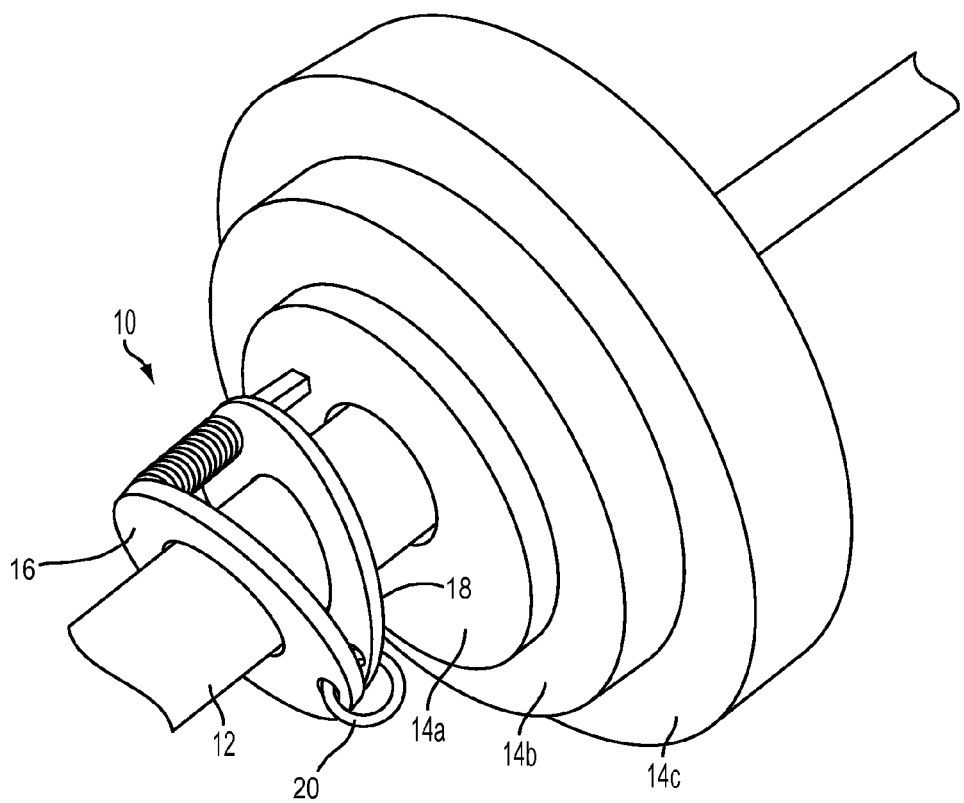
FIG. 1 is a perspective view of a shaft-mounted clamp in accordance with the present invention, attached to a weightlifting bar that is supporting a plurality of weight plates.
Figure 2:
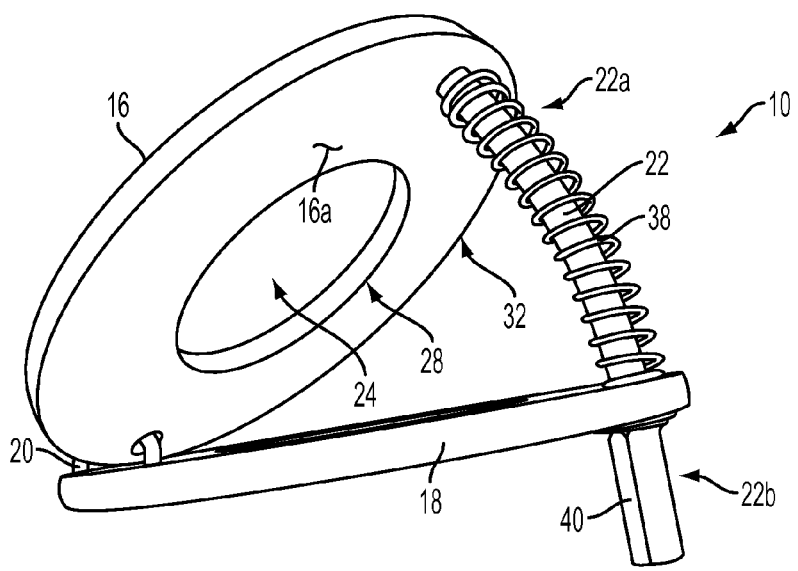
FIG. 2 is a perspective view of the clamp of FIG. 1.

Referring now to FIG. 1, a clamp 10 is supported on a shaft 12 which, in the illustrated embodiment, is the end portion of a weightlifting bar. Clamp 10 is positioned on shaft 12 outboard of a plurality of weight plates 14a-c that are supported on the shaft 12. Clamp 10 comprises a first clamp member 16 and a second clamp member 18 which, in the illustrated embodiment, comprise metal plates in the fond of annular rings. First clamp member 16 and second clamp member 18 are pivotably coupled to one another at one end via a hinge ring 20 (FIGS. 1-5). An elongate projection in the form of a pushrod 22 extends from first clamp member 16 (hereinafter "male ring") and projects or extends through the second clamp, member 18 (hereinafter "female ring").

Male ring 16 includes a first shaft-receiving aperture or through-hole 24, while female ring 18 includes a corresponding second shaft-receiving aperture or through-hole 26. Each through-hole 24, 26 is sized and shaped to receive shaft 12, and to readily move or slide along shaft 12 when the respective rings 16, 18 are in a certain orientation or within a range of orientations, as will be described in detail below. Each of the through-holes 24, 26 is defined by a corresponding inner circumferential edge portion 28, 30 of the respective male or female rings 16, 18. The male clamping ring 16 includes a circumferential outer edge portion 32, while the female ring 18 also includes an outer circumferential edge portion 34. Each ring 16, 18 includes a generally planar inboard surface 16a, 18a, and a generally planar outboard surface 16b, 18b. Inboard surfaces 16a, 18a face generally in the direction of an objection or article (such as weight plates 14a-c) supported on the shaft 12 to which clamp 10 is mounted, while outboard surfaces 16b, 18b are those which face generally away from the other articles supported on shaft 12, and are located opposite the corresponding inboard surfaces 16a, 18a. The inboard and outboard surfaces 16a-b, 18a-b extend between the corresponding inner and outer circumferential edge portions 28, 32 and 30, 34 of the respective male ring 16 and female ring 18.

Pushrod 22 projects from inboard surface 16a of male ring 16 at a location that is generally opposite hinge ring 20 and at or near outer circumferential edge portion 32. In the illustrated embodiment, pushrod 22 has a proximal end portion 22a that is joined to and extends generally perpendicularly away from inboard surface 16a, and has a distal, free end portion 22b that extends through a pushrod-receiving through-hole 36 (FIGS. 5A and 5B) of female clamping ring 18. Pushrod 22 is generally arcuate in shape, and has a radius of curvature approximately equal to the distance between pushrod 22 and hinge ring 20 so that through-hole 36 may be generally circular in shape to facilitate translation of female ring 18 along pushrod 22 when male ring 16 and female ring 18 are squeezed together, such as will be described in greater detail below.

It will be appreciated that the pushrod may be located closer to inner circumferential edge portion 28 of male ring 16, and/or may be located at a location along the male ring 16 that is not located directly across from the location of hinge ring 20, or the pushrod may extend past the female ring without extending through an opening in the female ring, all without departing from the spirit and scope of the present invention. Optionally, a generally straight or non-arcuate pushrod may be used in place of an arcuate pushrod, in which case the pushrod-receiving through-hole may be an elongate or oblong shape such as a slot, aligned radially, to permit the non-arcuate pushrod (or a pushrod having a radius of curvature that does not precisely match the distance of the pushrod to the pivot axis) to translate along the slot as the clamping rings are pivoted relative to one another.

In the illustrated embodiment, a biasing member in the form of a coil spring 38 is disposed around pushrod 22 between the male ring 16 and female ring 18. Spring 38 is held in compression between inboard surface 16a of male ring 16 and outboard surface 18b of female ring 18, so that spring 38 biases male ring 16 and female ring 18 apart from one another (i.e., toward an engaging position or configuration) such as shown in FIGS. 1-5. Spring 38 may be manually compressed and reconfigured in a disengaging position by squeezing the rings 16, 18 together, as will be described in greater detail below.

Figure 3:
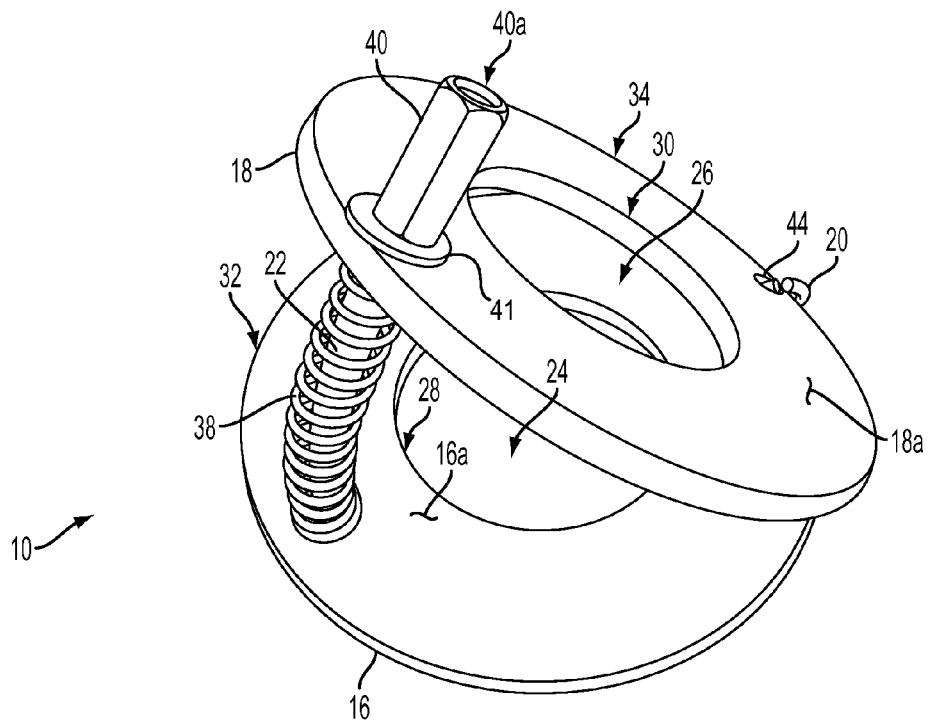
FIG. 3 is another perspective view of the clamp of FIG. 1.

In the illustrated embodiment, pushrod 22 includes, at its distal end portion 22b, an adjustable fastener 40 having a threaded bore 40a (FIG. 3) for receiving the distal end portion 22b, which is correspondingly threaded to engage fastener 40. Optionally, the distal end portion of the pushrod may comprise a threaded bore while the fastener comprises a correspondingly-threaded shaft for engagement with the bore. Adjustable fastener 40 is positioned along inboard surface 18a of female ring 18, and is adjustable (such as by rotating the fastener in a clockwise or counterclockwise direction) to adjust the spacing between male ring 16 and female ring 18 in the vicinity of pushrod 22. Adjustable fastener 40 has a diameter greater than through-hole 36 in female ring 18, whereas pushrod 22 has a diameter that is the same or slightly smaller than through-hole 36 so that female ring 18 moves or slides freely along pushrod 22 until contacting adjustable fastener 40. Optionally, one or more washers 41 may be positioned along pushrod 22, such as between an end of spring 38 and outboard surface 18b of female ring 18, and/or between adjustable fastener 40 and inboard surface 18a of female ring 18 as shown in FIG. 3, to ensure that spring 38 or fastener 40 will not enter or catch in the through-hole 36 of female ring 18. Typically, female ring 18 will not actually contact fastener 40 when clamp 10 is installed at shaft 12 because it is preferable to adjust fastener 40 so that the rings 16, 18 engage shaft 12 and are prevented from further movement by the shaft rather than by fastener 40, for reasons that will be described below.

Optionally, and instead of an adjustable fastener 40, it will be appreciated that substantially any element or feature having a greater diameter than the pushrod-receiving through-hole 36 may be used at the distal end portion 22b of pushrod 22 to retain female ring 18 at the pushrod 22, particularly when clamp 10 is not installed on the shaft 12. For example, the pushrod 22 may simply include a flared end or a flange at its distal end portion, such as a flange 43 shown in FIGS. 10A and 10B, or a removable but non-adjustable fastener, any of which could provide a similar retaining function as adjustable fastener 40, but without the adjustability.

Figure 4:
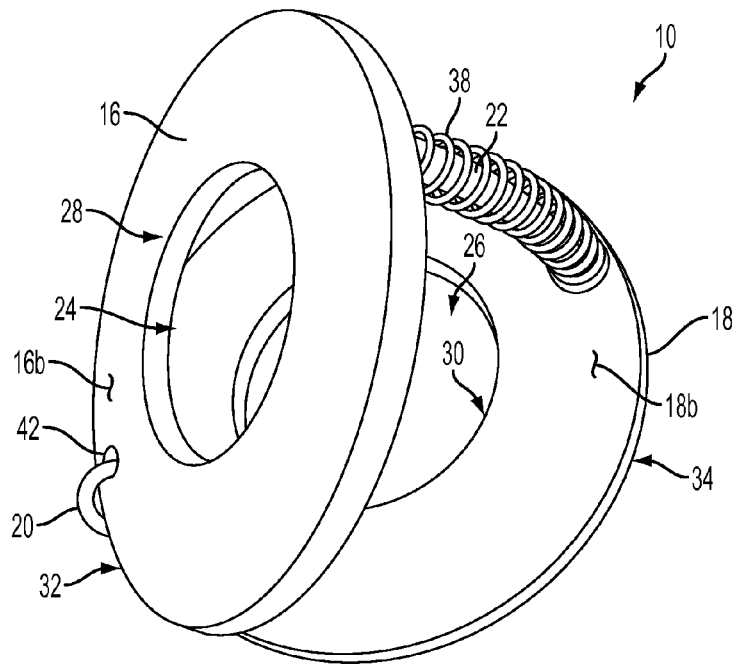
FIG. 4 is another perspective view of the clamp of FIG. 1.

As noted above, male ring 16 and female ring 18 are pivotably coupled to one another by hinge ring 20 at a location that, in the illustrated embodiment, is located generally opposite or across from pushrod 22 and pushrod-receiving through-hole 36. Hinge ring 20 is a metal ring disposed through a pair of corresponding hinge holes 42, 44 in male ring 16 and female ring 18, respectively (FIGS. 3 and 4). However, it will be appreciated that substantially any hinge-type connection or coupling may be used to hold the respective outer circumferential edge portions 32, 34 of male ring 16 and female ring 18 in close proximity to one another to allow pivoting movement of the rings 16, 18. For example, a more conventional hinge (e.g., a pin hinge) or a resilient spring-hinge may be used without departing from the spirit and scope of the present invention.

Figure 5A:
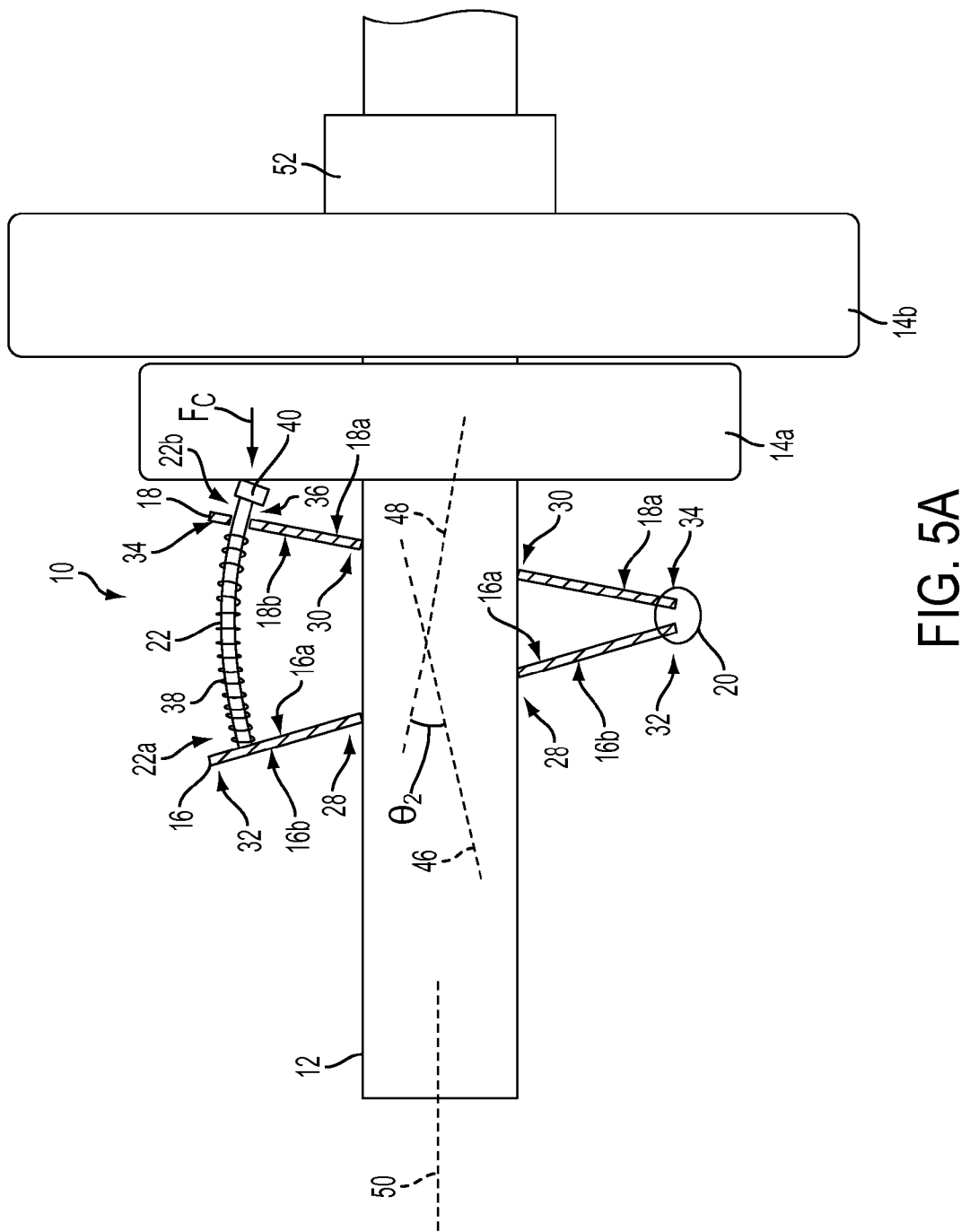
FIG. 5A is a side elevation and partial sectional view of a clamp in accordance with the present invention, shown in an engaging configuration on a shaft.
Figure 5B:
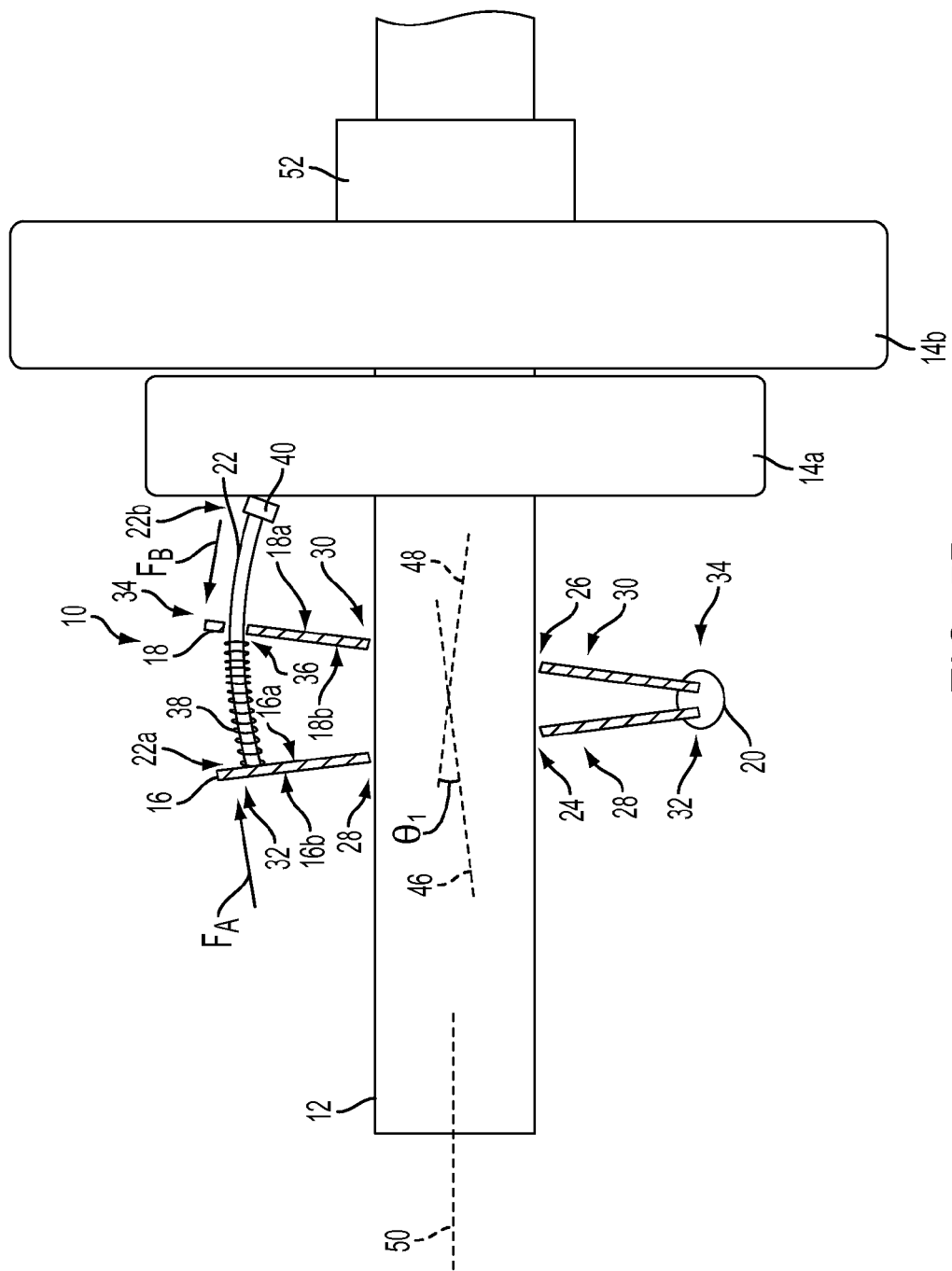
FIG. 5B is another side elevation and partial sectional view of the clamp of FIG. 5A, shown in a disengaging configuration along the shaft.

Each clamping ring 16, 18 has a respective longitudinal axis 46, 48 through the center of the respective through-hole 24, 26, such as shown in FIGS. 5A and 5B. Shaft 12 has its own longitudinal axis 50 defined through the center of the shaft 12. When clamp 10 is in a disengaging configuration (FIG. 5B), the longitudinal axes 46, 48 of the respective male and female clamping rings 16, 18 are arranged at an angle $\theta_1$ so that axes 46, 48 are more closely aligned with one another (i.e., they are more closely parallel), and so that they are also more closely aligned with the longitudinal axis 50 of shaft 12. In this configuration, the planes of the male and female clamping rings 16, 18 (e.g. the planes defined by inboard surfaces 16a, 18a and outboard surfaces 16b, 18b) are more closely perpendicular to the longitudinal axis 50 of shaft 12.

In the disengaging configuration of FIG. 5B, the first and second shaft-receiving through-holes 24, 26, which are at least somewhat larger in diameter than shaft 12, disengage or release pressure on the shaft 12 so that clamp 10 may be readily slid or moved along the shaft 12, such as for installation or removal or repositioning of the clamp along the shaft. Clamp 10 is configured in the disengaging configuration by pressing or squeezing the male and female clamping rings 16, 18 toward one another in the vicinity of pushrod 22, such as indicated by arrows designating forces $F_a$, $F_b$ in FIG. 5B. The application of forces $F_a$ and $F_b$ may correspond, to a manual squeezing force applied to inboard surface 18b of female ring 18 and outboard surface 18a of male ring 18 so that the male and female rings are urged together when the biasing force of coil spring 38 is overcome.

When the squeezing forces $F_a$, $F_b$ are released, coil spring 38 biases the male and female clamping rings 16, 18 apart from one another at pushrod 22 so that female clamping ring 18 slides or moves along pushrod 22 at pushrod-receiving through-hole 36 until the inner circumferential edge portions 28, 30 of male and female clamping rings 16, 18 engage or impinge on an outer surface of shaft 12 (FIG. 5A). When clamping rings 16, 18 assume this shaft-engaging configuration, longitudinal axes 46, 48 are further misaligned as compared to the disengaging configuration of FIG. 5B. The initial locking engagement of the inner circumferential edge portions 28, 30 of male and female clamping rings 16, 18 limits or substantially prevents the sliding movement of clamp 10 along shaft 12 when coil spring 38 biases clamp 10 to the engaging configuration of FIG. 5A.

Tighter or more secure engagement of at least male clamping ring 16 is achieved (to more strongly resist sliding movement of clamp 10 along shaft 12) when a force $F_c$ is applied to the distal end portion 22b of pushrod 22, such as at adjustable fastener 40 (FIG. 5A). Force $F_c$ may be applied to pushrod 22 by an article disposed along shaft 12, such as weight plate 14a. In the engaging configuration, the longitudinal axes 46, 48 of male and female clamping rings 16, 18 are more significantly misaligned with (or non-parallel to) one another, forming an angle $\theta_2$ that is greater than $\theta_1$, with axes 46, 48 even further angled relative to longitudinal axis 50 of shaft 12. The force $F_c$ applied to pushrod 22 is transmitted to male clamping ring 16, and any resultant slight translating or sliding movement of male ring 16 relative to shaft 12 transmits a pulling force to female clamping ring 18 at hinge hole 44 via hinge ring 20. This would in turn increase the degree or force of impingement of the inner circumferential edge portion 30 of female clamping ring 18 into shaft 12, thereby further resisting any additional movement of clamp 10 along shaft 12.

Thus, application of a force $F_c$ of substantially any magnitude that is less than the force required to buckle pushrod 22, would be met with an equal and opposite reaction force resisting substantial movement of clamp 10 due to the locking engagement of clamping rings 16, 18 with shaft 12. Notwithstanding the potentially large forces ($F_c$) that clamp 10 is capable of resisting, clamp 10 resists jamming on shaft 12 so that it may be readily removed from shaft 12 or moved along shaft 12 after the application of such forces. This may be accomplished by applying squeezing forces $F_a$, $F_b$ to male and female clamping rings 16, 18 sufficient to overcome the biasing force of coil spring 38 and any friction between the inner circumferential edge portions 28, 30 of male and female clamping rings 16, 18 with the outer surface of shaft 12. Thus, clamp 10 is suitable for one-handed use, or for use by persons with arthritis or low grip strength, without compromising the ability of the clamp to resist movement along the shaft when the clamp is in the engaging configuration.

Typically, the first and second shaft-receiving through-holes 24, 26 of male and female clamping rings 16, 18 are sized so that locking engagement with shaft 12 occurs before female clamping ring 18 contacts adjustable fastener 40 at distal end portion 22b of pushrod 22. It will be appreciated that if female clamping ring 18 were to contact fastener 40 prior to locking engagement of circumferential edge portions 28, 30 with shaft 12, then full locking engagement by both rings 16, 18 would not occur because fastener 40 is positioned too closely to the proximal end portion 22a of pushrod 22 to permit pivoting movement of rings 16, 18 to their fully-engaging configuration. Alternatively, if female clamping ring 18 were to contact fastener 40 approximately simultaneously with initial engagement of circumferential edge portions 28, 30 with shaft 12, then tighter or fully locking engagement may not occur because fastener 40 could limit or prevent additional pivoting movement of rings 16, 18 to a tighter or more fully-engaging configuration upon application of a force to pushrod 22. Thus, it is generally preferable to position adjustable fastener 40 so that it is spaced at least slightly from inboard surface 18b of female ring 18 when clamp 10 is in its engaging configuration on shaft 12, such as shown in FIG. 5A.

In operation, such as when clamp 10 is used on a barbell, weight plates 14a, 14b are initially installed on the shaft 12 of the barbell and slid or moved along the shaft until contacting a flange 52 (FIGS. 5A, 5B, and 6). Clamp 10 may then be squeezed (i.e., applying forces $F_a$ and $F_b$) to more closely align the clamping rings' longitudinal axes 46, 48 with one another and with longitudinal axis 50 of shaft 12, which more closely aligns first and second shaft-receiving through-holes 24, 26 of male and female clamping rings 16, 18. This permits first and second through-holes 24, 26 to receive shaft 12 so that clamp 10 may be slid or moved along the shaft 12 until adjustable fastener 40 contacts weight plate 14a (FIG. 5B).

Squeezing forces $F_a$, $F_b$ are then released to permit male and female clamping rings 16, 18 to be biased apart at pushrod 22 by coil spring 38. The correspondingly greater misalignment of the rings' longitudinal axes 46, 48 with each other and with longitudinal axis 50 of shaft 12 causes the inner circumferential edge portions 28, 30 of male and female clamping rings 16, 18 to engage or impinge upon shaft 12 so that clamp 10 is tightly secured to shaft 12 (FIG. 5A). If, for example, female clamping ring 18 were found to contact adjustable fastener 40 prior to full engagement of the inner circumferential edge portions 28, 30 with shaft 12, adjustable fastener 40 could be adjusted outwardly (i.e., to the right as viewed in FIGS. 5A and 5B) at least until the clamping rings 16, 18 have pivoted further so that inner circumferential edge portions 28, 30 engage shaft 12.

It can now be appreciated that the length of pushrod 22 and the adjustability of fastener 40 will increase the adaptability of clamp 10 for use on shafts of different sizes. For example, the effective length of pushrod 22 (i.e., as measured between the fastener 40 and the inboard surface 16b of male ring 16) may be lengthened by unscrewing or moving the fastener 40 further away from male clamping ring 16. This would permit wider spacing of male and female clamping rings 16, 18, and thus greater misalignment of longitudinal axes 46, 48 for a potentially tighter engagement with shaft 12. Alternatively, a smaller shaft could be engaged by male and female clamping rings 16, 18 when greater misalignment of the longitudinal axes 46, 48 is permitted.

Figure 6A:
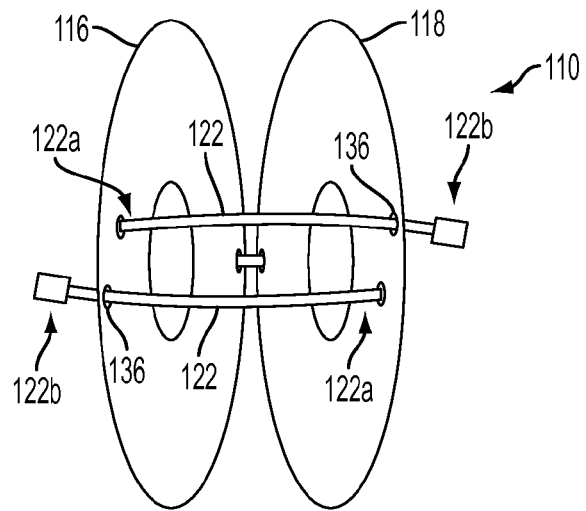
FIG. 6A is a top plan view of another clamp in accordance with the present invention, the clamp having a pair of pushrods.
Figure 6B:
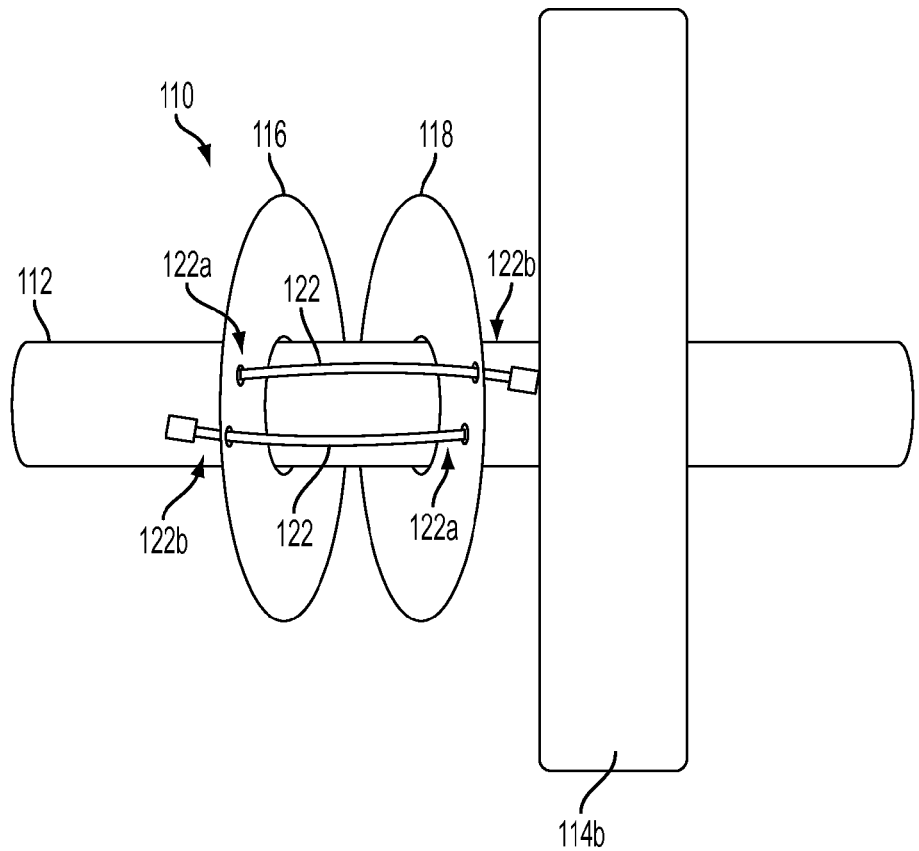
FIG. 6B is a top plan view of the clamp of FIG. 6A shown installed along a shaft.

Optionally, a clamp 110 may include a pair of clamping rings 116, 118 that are substantially identical to one another in that each includes its own pushrod 122 having a proximal end portion 122a and a distal end portion 122b (FIGS. 6A and 6B). The distal end portions 122b extend through respective pushrod-receiving through-holes 136 in each clamping ring 116, 118 so that clamp 110 may be positioned in either of two orientations (rotated 180 degrees from one another) so that one of the pushrods 122 will contact and resist movement of a weight plate 14b or other article disposed along the shaft 112 on which clamp 110 is mounted (FIG. 6B). Thus, clamp 110 may be positioned along the shaft 112 without regard for which clamping ring 116, 118 is positioned closest to the article (e.g. weight plate 14b) to be retained on the shaft 112 so that one of the push rods 122 (i.e., the push rod 122 extending from clamping ring 118 and through clamping ring 116 in FIG. 6B) is unused. It is also envisioned that clamp 110 may be used to resist or impede movement of articles positioned on opposite sides of the clamp 110.

Figure 8:
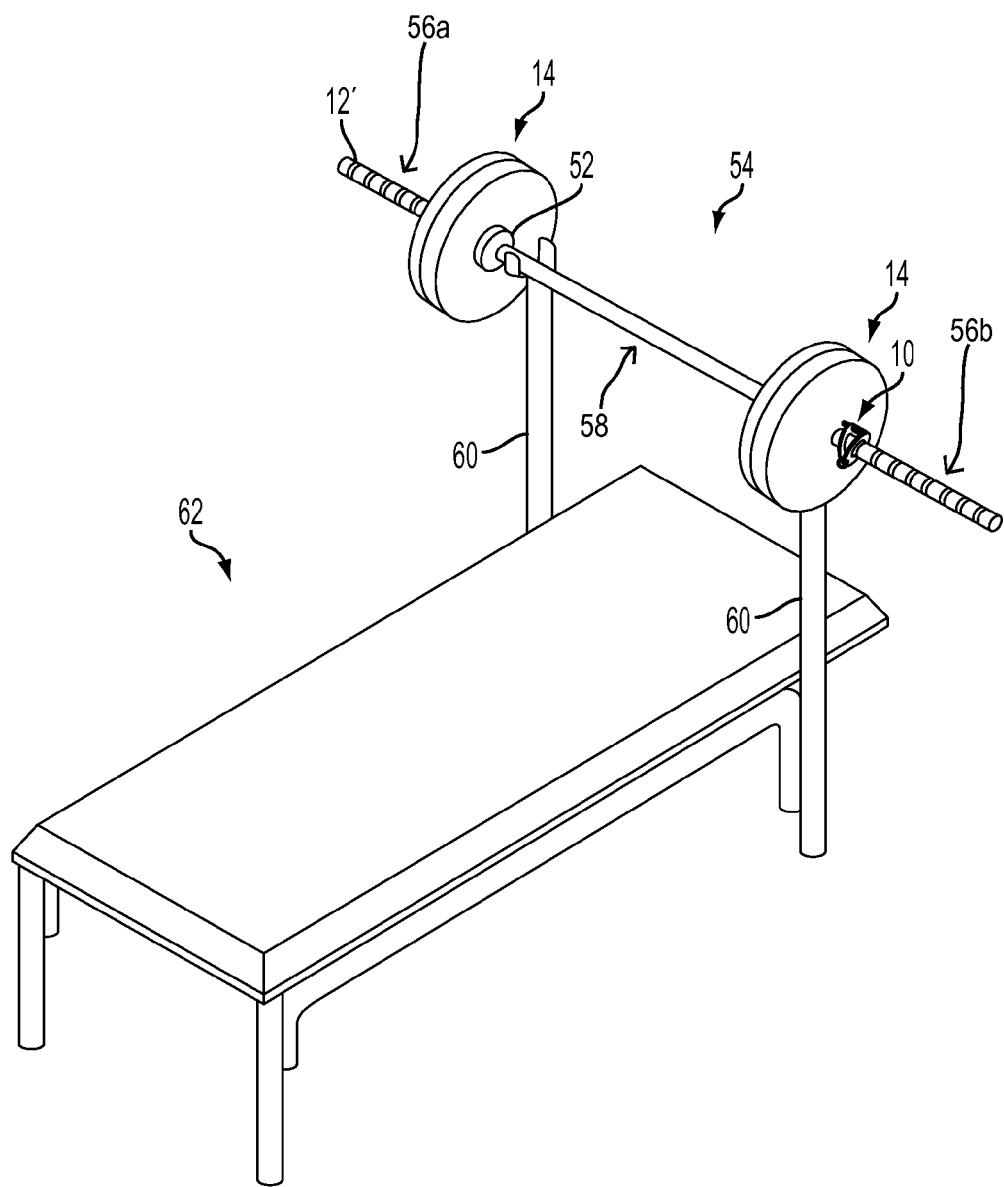
FIG. 8 is a perspective view of another shaft-mounted clamp in accordance with the present invention, attached to a weightlifting bar, which is supported on a weightlifting bench.
Figure 12:
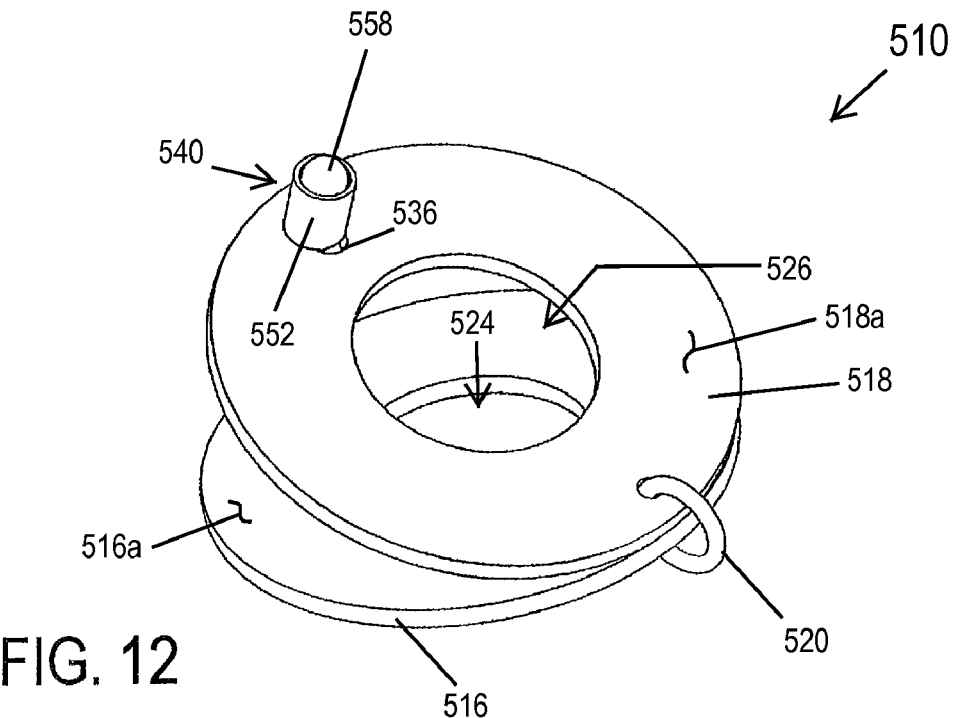
FIG. 12 is a perspective view of another clamp in accordance with the present invention.
Figure 13:
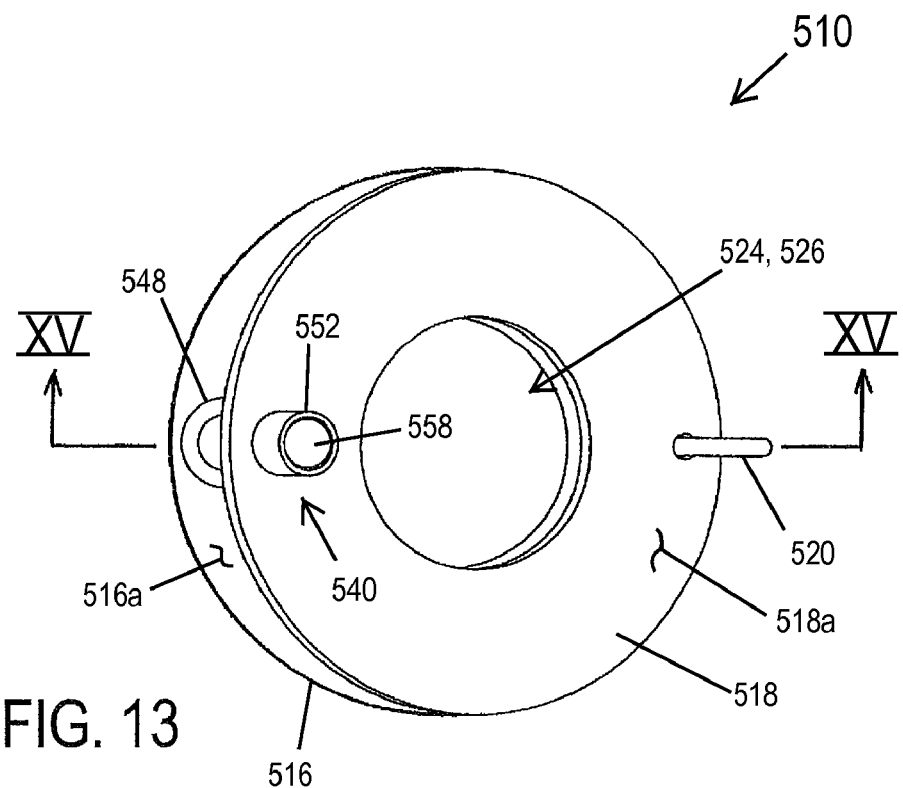
FIG. 13 is a top plan view of the clamp of FIG. 12.
Figure 14:
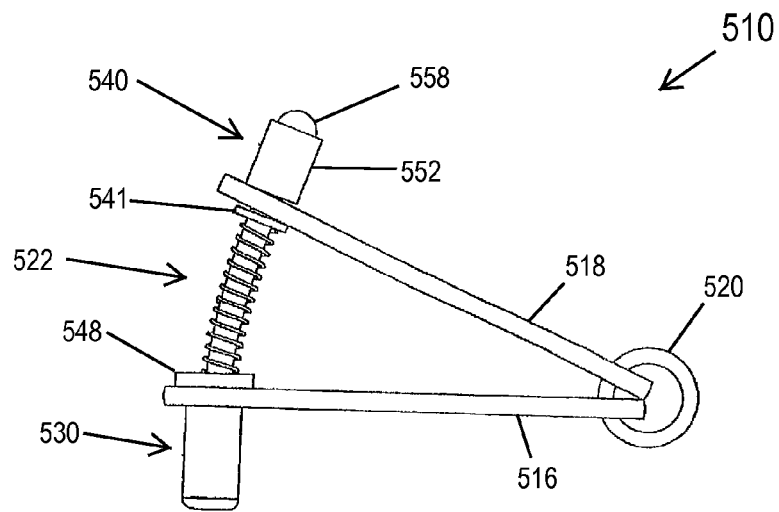
FIG. 14 is a side elevation of the clamp of FIG. 12.

Clamp 10 may be particularly well-suited to operate in environments in which shaft-mounted articles or objects are to be positioned at specific locations along a shaft. For example, one or more weight plates 14 may be positioned along the weightlifting bar 12' of a barbell 54 (FIG. 8). The weight plates 14 are mounted to respective opposed end portions 56a, 56b of the weightlifting bar 12', which has an inner gripping portion 58 disposed between the opposed end portions 56a, 56b. A flange 52 at each opposed end portion 56a, 56b limits the extent to which weight plates 14 may be moved inwardly on the weightlifting bar 12'. After the weight plates 14 are appropriately positioned, a clamp 10 may be readily and quickly installed at each end portion 56a, 56b simply by squeezing the male and female clamping rings of each clamp until the first and second shaft-receiving through-holes 24, 26 are sufficiently aligned to receive the weight-lifting bar 12'. The clamps 10 are then slid on the respective opposed end portions 56a, 56b of weight-lifting bar 12' until the adjustable fasteners 40 (not numbered in FIG. 8, for clarity) contact the outermost weight plate 14, after which the squeezing forces on the clamping rings are released, thereby locking or engaging the clamps 10 with the weight-lifting bar 12'.

Clamps 10 will prevent the removal of weight plates 14 from the opposed end portions 56a, 56b of weight-lifting bar 12' until the clamps 10 are again squeezed to disengage the clamping rings from the bar. It will be appreciated that clamps 10 may be positioned substantially anywhere along the opposed end portions 56a, 56b of weight-lifting bar 12', including at positions that are spaced from weight plates 14, while remaining substantially locked and engaged with the weight-lifting bar 12'. If a space is left between fastener 40 and weight plate 14, any outboard sliding movement of a weight plate 14 along the end portion 56a or 56b would be halted by the clamp 10 once the weight contacts the adjustable fastener 40 on pushrod 22 and increases the biting or engaging force of the male and female clamping rings 16, 18 with the respective end portion 56a, 56b of weight-lifting bar 12'. For example, the sliding movement of weight plates 14 may be caused by non-horizontal positioning of weight-lifting bar 12' once the barbell 54 is lifted from the weight-lifting bar supports 60 of a weight-lifting bench 62 (FIG. 8).

Thus, male and female clamping rings 16, 18 may be substantially identical to one another, except that male clamping ring 16 has pushrod 22 rigidly attached thereto, while female clamping ring 18 has a pushrod-receiving through-hole 36 for receiving at least the distal end portion 22b of pushrod 22. Clamping rings 16, 18 may be generally planar metal plates or washers that are generally circular in shape, as shown. Alternatively, the clamping rings may be substantially any other generally annular shape, or even an open shape such as a C-shape, with a hole or opening for receiving the shaft having a circular or non-circular cross section. For example, the male and female clamping rings may have non-circular through-holes for receiving a circular or non-circular shaft. It will be appreciated that the through-holes of the clamping rings do not necessarily correspond precisely to the shape of the shaft to which they are attachable. As long as the through-holes of the male and female clamping rings are at least slightly larger than the shaft to which the clamp is to be mounted, the inner circumferential edge portions of the clamping rings will be able to engage the outer surface of the shaft, regardless of shape, to resist movement of the clamp along the shaft. For example, clamping rings with square shaft-receiving through-holes may be adapted to receive and engage a shaft that is circular and square, triangular, or polygonal with substantially any number of sides) in cross-section.

Figure 7:
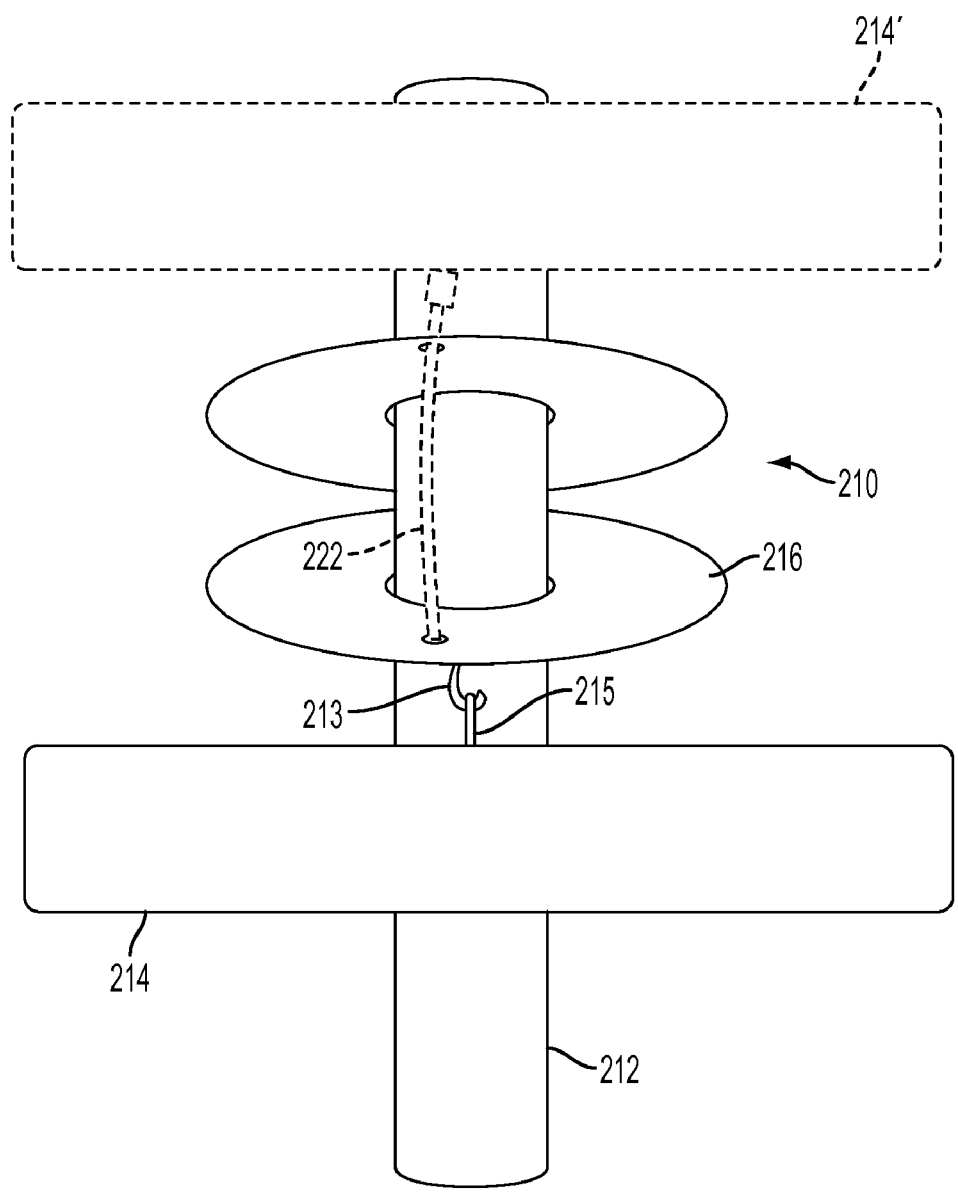
FIG. 7 is a side elevation of another clamp in accordance with the present invention, the clamp including a hook for suspending an article along a vertical shaft.

Other clamps are envisioned in which additional features provide enhanced utility and/or applications, such as those shown in FIGS. 7 and 9A-11B. For example, a clamp 210 may be adapted for use along a generally vertically-oriented shaft 212, and may include a coupling device such as a hook 213 extending from a lower surface of a clamping ring 216 (FIG. 7). Hook 213 engages a loop 215 or other coupling device on an article 214 that permits article 214 to be suspended below clamp 210. Optionally, clamping ring 216 may be a male clamping ring having a pushrod 222 for supporting an article 214' positioned above clamp 210 (pushrod 222 and article 214' shown in dashed lines in FIG. 7). Thus, clamp 210 may be used to suspend articles from shaft 212, such as for use in suspending garbage bags or camping gear out of reach of animals at a campsite, for example, or for fixturing or suspending other articles from or along a generally vertical shaft.

It will be appreciated that application of a downward force to hook 213 has substantially the same effect on the engagement of clamp 210 with shaft 212 as would application of a force (such as by article 214') to the pushrod 222. That is, the clamping rings of clamp 210 would be expected to engage shaft 212 in substantially the same manner, to resist movement of the clamp 210 along the shaft 212, regardless of whether a pulling force is applied to hook 213 or a pushing force is applied to optional pushrod 222 (such as by article 214'). It will further be appreciated that clamp 210 may be inverted on shaft 212, as compared to the orientation of clamp 210 shown in FIG. 7, so that hook 213 (or other coupling device) extends generally upwardly for use in suspending shaft 212 in a substantially vertical orientation using clamp 210.

Optionally, clamp 10 may be installed along an inner shaft 312 that is telescopingly received in an outer shaft 412 to fix the position of inner shaft 312 relative to outer shaft 412 (FIGS. 9A-10B). In the illustrated embodiment, male clamping ring 16 faces generally upwardly while female clamping ring 18 faces generally downwardly along inner shaft 312, which is arranged vertically. An annular ring 317 is fixedly coupled at an upper end portion 412a of outer shaft 412 and serves to contact the pushrod 22 when inner shaft 312 is sufficiently lowered, as in FIGS. 9A, 9B, and 10B. Accordingly, the downward force acting upon inner shaft 312, such as due to the weight of shaft 312 and any other article(s) supported on the shaft 312, increases the force applied to annular ring 317 by pushrod 22, which in turn increases the engagement of clamp 10 with inner shaft 312 and substantially prevents inner shaft 312 from lowering any further with respect to outer shaft 412. This may be used, for example, to raise and fix masts at a desired height, such as for use with flagpoles, antenna mounts, or other fixture mounts. It will be appreciated that this arrangement may work equally well with telescoping shafts arranged horizontally or in any other manner, particularly when there is a force urging the telescoping shafts together. Optionally, another clamp (similar or identical to clamp 210, described above) may be used in place of clamp 10 to prevent telescoping shafts from being pulled apart. It is envisioned that this may be accomplished by using a coupling member (such as a loop) in place of annular ring 317 on outer shaft 412, which couples to another coupling member on the clamp (such as a hook) for engaging the loop on outer shaft 412.

Optionally, another clamp 410 includes a hook 413 for suspending another article, such as from a pulley 419 (FIGS. 9A, 9B, 11A, and 11B). Clamp 410 includes a pair of split clamping rings 416, 418 that permit clamp 410 to be installed along a shaft (such as shaft 312, shown) without access to an end portion of the shaft. As best shown in FIG. 11B, each clamping ring 416, 418 is assembled from a pair of respective halves 416c-d, 418c-d that are joined by a pair of joiner elements 421. Each joiner element 421 is removably coupled to each half of one of the clamping rings 416, 418 using removable fasteners 423. The halves 416c-d, 418c-d are separable from one another upon removal of all of the fasteners 423 on either halves 416c, 418c or halves 416d, 418d. Once the halves 416c-d, 418c-d are no longer coupled to one another by fasteners 423 and joiner elements 421, clamp 410 may be removed from the shaft by pulling the respective halves of each clamping ring 416, 418 away from one another, and in directions that are generally radially away from shaft 312. It will be appreciated that clamp 410 may be positioned along a shaft in a reverse manner, by splitting apart the clamping ring halves, positioning the halves on either side of the shaft, and coupling the halves together using joiner elements 421 and fasteners 423. In order to speed installation and/or removal of a split clamp, it will be appreciated that split clamp halves may be pivotably coupled to one another along one edge or end, and releasably coupled or latched to one another at an opposite edge or end, whereby removal or unlatching of the fasteners on one side permits the halves of each clamping ring to be pivoted so as to open in a clamshell manner, without fully separating the halves during installation or removal.

Optionally, and with reference to FIGS. 12-15, another clamp 510 includes a male clamping ring 516 and a female clamping ring 518 pivotably joined by a hinge ring 520, all of which are substantially similar to clamp 10, clamping rings 16, 18, and hinge ring 20, described above. Male and female clamping rings 516, 518 have respective inboard surfaces 516a, 518a and outboard surfaces 516b, 518b, and define respective openings 524, 526 (FIGS. 12, 13, and 15) for receiving a shaft. Clamp 510 includes a pushrod assembly 522 that is fixedly coupled at a proximal end portion 522a to male ring 516, and includes a distal end portion 522b that projects through a through-hole 536 (FIG. 15) in female ring 518, which is oblong and shape and has a major axis aligned substantially radially.

Pushrod assembly 522 includes a generally arcuate or non-linear pushrod shaft 528 having a proximal end portion 528a and a distal end portion 528b, each with a respective male-threaded region. Proximal end portion 528a is threadably received in a pushrod mounting member 530 (FIGS. 13-15), and distal end portion 528b is threadably received in an adjustable fastener 540. Pushrod assembly 522 further includes a biasing member in the form of a coil spring 532 disposed around a portion of pushrod 528 and held in compression between pushrod mounting member 530 and outboard surface 518b of female ring 518. A washer 541 is disposed along pushrod 528 between spring 532 and female ring 518, to limit or prevent spring 532 from entering through-hole 536, so that washer 541 and the oblong through-hole 536 cooperate to facilitate smooth movement of female ring 518 along shaft 532.

Figure 15:
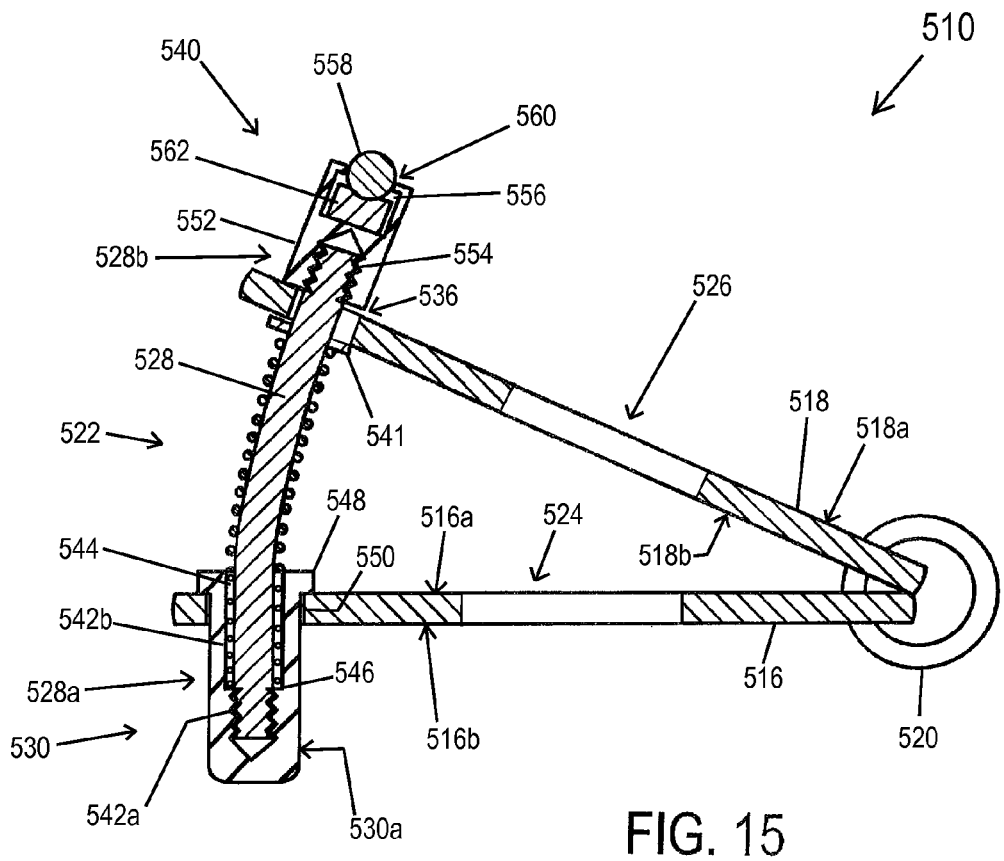
FIG. 15 is a side sectional elevation taken along line XV-XV in FIG. 13.

Pushrod mounting member 530 has a generally cylindrical outer surface 530a, and defines a cylindrical bore 542 for receiving proximal end portion 528a of pushrod 528 and a portion of spring 532, as best seen in FIG. 15. Bore 542 includes a threaded bore section 542a for threadably engaging the male threaded region of end portion 528a. A larger-diameter bore section 542b defines the outer diameter of an annular space 544 located outwardly from proximal end portion 528a of pushrod 528. Annular space 544 receives a portion of spring 532, which rests against a shoulder 546 at the start of threaded bore section 542a. A flange 548 of pushrod mounting member 530 has a greater diameter than cylindrical outer surface 530a, which is received in a through-hole 550 of male ring 516. Through-hole 550 may be substantially the same diameter as cylindrical outer surface 530a of pushrod mounting member 530, so that mounting member 530 may be interference-fit or press-fit into through-hole 550 (if through-hole 550 is slightly smaller than outer surface 530a), or so that mounting member 530 may be welded or mechanically attached to male ring 516 in some other manner. Optionally, through-hole 550 may be slightly larger than outer surface 530a, so that the pushrod mounting member 530 can be readily installed and removed from through-hole by compressing spring 532, which otherwise biases pushrod mounting member 530 into full engagement with male ring 516 at through-hole 550 so that flange 548 engages inboard surface 516a of male ring 516 around through-hole 550.

Adjustable fastener 540 is similar to fastener 40, described above, in that both fasteners 540, 40 may be adjusted along their respective pushrods 528, 22 via threaded engagement. Adjustable fastener 540 includes a fastener body 552 defining a mounting portion in the form of a female threaded bore 554 at one end for threadably receiving the male threaded region of distal end portion 528*b* of pushrod 528. Fastener body 552 further defines a socket portion or chamber 556 at its opposite end for receiving a ball bearing 558 having a diameter that is at least slightly greater than the diameter of an opening 560 of body 552 in which bearing 558 is partially received. As best seen in FIG. 15, a portion of bearing 558 projects outwardly from opening 560, and another portion of bearing 558 extends inwardly into socket or chamber 556. Thus, articles coming into contact with pushrod assembly 522 engage bearing 558, which may permit at least rotational movement of the articles in contact, while preventing or minimizing gouging, scratching, or other damage that may otherwise occur if a sharp edge were permitted to contact the article.

In the illustrated embodiment, chamber 556 is sufficiently large so that bearing 558 can move inwardly and outwardly relative to fastener body 552, to at least a limited extent. Bearing 558 may rotate and/or roll along an article, such as a weight plate, that engages bearing 558 to push against pushrod 528. Optionally, a resilient biasing member 562 may be positioned inside of chamber 556 to bias bearing 558 outwardly in a spring-like or shock-absorbing manner. For example, biasing member 562 may be a coil or leave spring, or a resilient pad such as neoprene rubber or the like.

Accordingly, clamp 510 is functionally similar to clamp 10, but includes features that may facilitate its use, adjustment, versatility, and serviceability. For example, pushrod assembly 522 may be readily separated from male and female clamp portions 516, 518 by detaching adjustable fastener 540 from distal end portion 528*b* of pushrod 28, or may be separated as a unit by urging the pushrod mounting member 530 through the through-hole 550 in male ring 516. Ball bearing 558 facilitates use of the clamp 510 with shaft-mounted articles that may be susceptible to damage, and may provide a shock-absorbing function to further limit or prevent damage or jarring impacts of articles with the fastener 540.

Thus, the clamp of the present invention provides a relatively inexpensive, easy-to-install device for placement along a plurality of positions on a shaft. The clamp is capable of providing very strong resistance to movement of other articles along the shaft, or to movement of one shaft relative to another, while still remaining easy to reposition or remove, such as by one-handed manual operation.

Changes and modifications in the specifically described embodiments can be carried out without departing from the principles of the present invention, which is intended to be limited only by the scope of the appended claims, as interpreted according to the principles of patent law including the doctrine of equivalents.

The invention claimed is:

1. A shaft-mounted clamp comprising:
   first and second clamp members having respective inner edges defining first and second through-holes in said first and second clamp members, respectively, said first and second through-holes each configured to receive a shaft;
   a hinge member coupled to each of said first and second clamp members at locations spaced outwardly from said first and second through-holes, whereby said clamp members are pivotably coupled to one another by said hinge member and are movable between an engaging configuration and a disengaging configuration;
   an elongate projection having a proximal end portion and a distal end portion, said proximal end portion coupled to said first clamp member, and said distal end portion extending toward and at least partially beyond said second clamp member;
   wherein when said first and second clamp members are in said disengaging configuration, the shaft may be readily positioned in or moved along both of said first and second through-holes, and wherein when said first and second clamp members are in said engaging configuration, the shaft is fixedly engaged by said inner edge of at least said first clamp member; and
   wherein the engagement of said inner edge of said first clamp member with the shaft is increasable by applying a force to said distal end portion of said elongate projection in the general direction of said first clamp member.

2. The shaft-mounted clamp of claim 1, further comprising a biasing member disposed between said first and second clamp members, said biasing member configured to bias said first and second clamp members apart from one another and generally toward said engaging configuration.

3. The shaft-mounted clamp of claim 2, wherein said biasing member comprises a coil spring disposed around said elongate projection.

4. The shaft-mounted clamp of claim 1, wherein said second clamp member defines a third through-hole, said elongate projection extending through said third through-hole whereby said second clamp member moves along said elongate projection as said clamp members move between the engaging configuration and the disengaging configuration.

5. The shaft-mounted clamp of claim 4, wherein said elongate projection has a radius of curvature approximately equal to the distance between said elongate projection and said hinge member.

6. The shaft-mounted clamp of claim 4, wherein said elongate projection comprises a stop member at said distal end portion, said stop member having a larger diameter than said third through-hole of said second annular clamp member and configured to limit the maximum spacing between said first and second annular clamp members at said elongate projection.

7. The shaft-mounted clamp of claim 6, wherein said stop member comprises one of (i) a flared end of said elongate projection, (ii) a flange at said elongate projection, and (iii) an adjustable fastener.

8. The shaft-mounted clamp of claim 6, wherein said stop member comprises an adjustable fastener, said adjustable fastener comprising:
   a mounting end portion for adjustably securing said adjustable fastener at two or more positions along said elongate projection;
   a socket portion at an opposite end portion of said adjustable fastener;
   a ball bearing received in said socket portion and protruding at least partially from said socket portion.

9. The shaft-mounted clamp of claim 8, further comprising a biasing member in said socket portion, said biasing member configured to apply an outward biasing force to said ball bearing and to permit said ball bearing to be urged into said socket portion against said biasing force.

10. The shaft-mounted clamp of claim 1, wherein said first and second clamp members each comprises a split ring having two halves and at least one releasable fastener adapted to selectively hold the halves together and to permit at least partial separation of the halves.

11. The shaft-mounted clamp of claim 1, further in combination with a weightlifting device, said weightlifting device comprising:
 an elongate weightlifting bar having a central gripping portion and opposed end portions outboard of said central gripping portion; and
 a flange disposed at each of said opposed end portions of said elongate bar, each of said flanges having a diameter greater than that of said elongate weightlifting bar, said flanges configured to substantially prevent weights disposed at said opposed end portions of said elongate weightlifting bar from moving to said central gripping portion of said elongate weightlifting bar.

12. The shaft-mounted clamp of claim 4, wherein said third through-hole comprises an oblong shape having a major axis that is substantially radially aligned with said through-hole of said second clamp member.

13. A shaft-mounted clamp comprising:
 a first clamp member having an outer circumferential edge portion and an inner circumferential edge portion, said inner circumferential edge portion defining a first through-hole, and said first clamp member including an outwardly-facing planar surface and an inwardly-facing planar surface, each of said planar surfaces extending between said inner and outer circumferential edge portions;
 a second clamp member having an outer circumferential edge portion and an inner circumferential edge portion, said inner circumferential edge portion defining a second through-hole, and said second clamp member including an outwardly-facing planar surface and an inwardly-facing planar surface, each of said planar surfaces extending between said inner and outer circumferential edge portions, and said second clamp member defining a third through-hole between said inner and outer circumferential edge portions;
 a hinge member coupled to each of said first and second clamp members along their respective outer edge portions, whereby said clamp members are pivotably coupled to one another;
 an elongate projection having a proximal end portion and a distal end portion, said proximal end portion coupled to said first clamp member, said elongate projection extending from said inwardly-facing planar surface of said first clamp member and extending through said third through-hole of said second clamp member, wherein said distal end portion projects from said inwardly-facing planar surface of said second clamp member at said third through-hole;
 wherein said first and second clamp members are pivotable relative to one another at said hinge member between an engaging configuration and a disengaging configuration;
 wherein when said first and second clamp members are in said disengaging configuration, a shaft having a diameter at least somewhat smaller than the diameters of said first and second through-holes may be readily positioned in or removed from both of said first and second through-holes, and wherein when said first and second clamp members are in said engaging configuration, the shaft is fixedly engaged by said inner circumferential edge portion of at least said first clamp member; and
 wherein the engagement of said inner circumferential edge portion of said first clamp member is enhanced by a force applied to said distal end portion of said elongate projection in the general direction of said first clamp member.

14. The shaft-mounted clamp of claim 13, further comprising a biasing member disposed between said first and second clamp members, said biasing member configured to bias said first and second clamp members apart from one another and generally toward said engaging configuration.

15. The shaft-mounted clamp of claim 14, wherein said biasing member comprises a coil spring disposed around said elongate projection and positioned between said inner surface of said first clamp member and said outer surface of said second clamp member.

16. The shaft-mounted clamp of claim 15, wherein said elongate projection comprises an arcuate shape having a radius of curvature approximately equal to the distance between said elongate projection and said hinge member.

17. The shaft-mounted clamp of claim 13, wherein said stop member comprises an adjustable fastener, wherein one of said adjustable fastener and said distal end portion of said elongate projection comprises a threaded bore and the other of said adjustable fastener and said distal end portion is correspondingly threaded for mutual engagement, and wherein the spacing between said first and second annular clamp members is adjustable by adjusting the positioning of said adjustable fastener relative to said elongate projection.

18. The shaft-mounted clamp of claim 13, wherein said hinge member comprises a ring and each of said first and second annular clamp members comprises a respective hinge through-hole, said ring disposed through each of said hinge through-holes.

19. The shaft-mounted clamp of claim 13, further comprising:
 a fourth through-hole in said first annular clamp member between said inner and outer circumferential edge portions;
 a second elongate projection, said second elongate projection having a proximal end portion and a distal end portion, said proximal end portion coupled to said second clamp member, said elongate projection extending from said outwardly-facing planar surface of said second clamp member and extending through said fourth through-hole of said first clamp member; and
 wherein said distal end portion of said second elongate projection projects from said outwardly-facing planar surface of said first clamp member at said fourth through-hole.

20. The shaft-mounted clamp of claim 13, wherein said first and second clamp members each comprises a plate generally in the form of an annular ring.

21. The shaft-mounted clamp of claim 13, further comprising a coupler at said first clamp member, said coupler adapted to suspend an article from said first clamp member whereby a force applied to said coupler in a direction generally away from said first clamp member enhances the engagement of said inner circumferential edge portion of said first clamp member with the shaft.

22. The shaft-mounted clamp of claim 13, further in combination with a weightlifting device, said weightlifting device comprising:
 an elongate weightlifting bar having a central gripping portion and opposed end portions outboard of said central gripping portion; and
 a flange disposed at each of said opposed end portions of said elongate bar, each of said flanges having a diameter greater than that of said elongate weightlifting bar, said flanges configured to substantially prevent weights disposed at said opposed end portions of said elongate weightlifting bar from moving to said central gripping portion of said elongate weightlifting bar.

* * * * *